United States Patent
Barila

(10) Patent No.: US 6,827,359 B2
(45) Date of Patent: Dec. 7, 2004

(54) NON-DRIVE FRONT AXLE STEERING KNUCKLE

(75) Inventor: Martin Barila, Pisgah Forrest, NC (US)

(73) Assignee: ArvinMeritor Technology, LLC., Troy, MI (US)

( * ) Notice: Subject to any disclaimer, the term of this patent is extended or adjusted under 35 U.S.C. 154(b) by 0 days.

(21) Appl. No.: 10/161,384

(22) Filed: Jun. 3, 2002

(65) Prior Publication Data

US 2003/0222422 A1 Dec. 4, 2003

(51) Int. Cl.[7] ................................................ B62D 7/18
(52) U.S. Cl. ................................................ 280/93.512
(58) Field of Search .................................... 280/93.512

(56) References Cited

U.S. PATENT DOCUMENTS

| | | | | |
|---|---|---|---|---|
| 677,136 | A | * 6/1901 | Krastin | 280/93.512 |
| 1,568,782 | A | * 1/1926 | Swayne | 280/93.512 |
| 1,783,614 | A | * 12/1930 | Griswold | 280/93.512 |
| 1,795,428 | A | * 3/1931 | Gurney | 280/93.512 |
| 2,057,372 | A | * 10/1936 | Douglas et al. | 280/93.512 |
| 2,094,945 | A | * 10/1937 | Hesselrode | 280/93.512 |
| 2,829,903 | A | * 4/1958 | Ulinski | 280/93.512 |
| 3,981,513 | A | * 9/1976 | Erskine | 280/93.512 |
| 4,798,394 | A | * 1/1989 | Pollock et al. | 280/93.512 |
| 5,340,137 | A | * 8/1994 | Carraro et al. | 280/93.512 |
| 6,029,986 | A | * 2/2000 | Bodin et al. | 280/93.512 |
| 6,113,118 | A | * 9/2000 | Zebolsky | 280/93.512 |
| 6,499,752 | B1 | * 12/2002 | Davis | 280/93.512 |
| 6,607,203 | B2 | * 8/2003 | Bodin | 280/93.512 |

FOREIGN PATENT DOCUMENTS

| | | | |
|---|---|---|---|
| JP | 54-67926 | B1 * | 5/1979 |
| JP | 57-191166 | B1 * | 11/1982 |
| JP | 149268 | B1 * | 6/1988 |
| JP | 2000-309281 | B1 * | 11/2000 |
| JP | 2002-120748 | B1 * | 4/2002 |
| JP | 2002-248957 | B1 * | 9/2002 |
| JP | 2002-249064 | B1 * | 9/2002 |

* cited by examiner

*Primary Examiner*—Darren W. Ark
(74) *Attorney, Agent, or Firm*—Carlson, Gaskey & Olds, P.C.

(57) ABSTRACT

A steering knuckle assembly is provided that includes an axle beam having an end with spaced apart first and second surfaces and a hole extending therebetween. A knuckle includes spaced apart first and second cavities that have first and second bores respectively adjacent to the first and second surfaces. A pin assembly is disposed in the hole. That pin assembly includes first and second ends, one of which may be a knot and the other, which may be a head. The ends are disposed within the cavities to secure the knuckle to the axle beam end. First and second bearing assemblies are disposed within first and second bores and about the pin. The bearing assemblies engage the surfaces when the nut is tightened on the pin body to produce a compressive force urging the bearing assemblies into engagement with the surfaces of the axle beam. The present invention also utilizes lubed for life bearings containing seals that retain lubricant within the bearing assembly such that these zerk fittings on the cap may be eliminated.

15 Claims, 2 Drawing Sheets

NON-DRIVE FRONT AXLE STEERING KNUCKLE

BACKGROUND OF THE INVENTION

This invention relates to a steering knuckle arrangement, and more particularly, the invention relates to a pin and bearing arrangement for a steering knuckle.

Steering knuckles are secured to axle beams by pins. The pins may be tapered and received within a tapered hole in the axle beam to axially locate the pin relative to the axle beam. Alternatively, the pin may have a slot or groove cut in the body of the pin received within the hole to receive a draw key that may axially and rotatably locate the pin relative to the axle beam. A draw key boss is formed on the axle beam and a hole is drilled and tapped in the axle beam to receive the threaded draw key.

Bushings are typically pressed into the knuckle to receive the pin. Alternatively, bearing assemblies may be arranged within opposing bores on either side of the steering knuckle. The bearing assemblies are axially located against shoulders that space the bearing assemblies from the outer surfaces of the axle beam about the hole. A pair of nuts may be threadingly received on either end of the pin to urge the bearing assemblies against the shoulders. A lubricant seal is arranged between the bearing assemblies and the surfaces of the axle beam. Caps may be secured to the outer portions of the knuckle to enclose the bearing assemblies. Lubricant is inserted into the bearing cavities through zerk fittings in the caps.

Prior steering knuckle assemblies can be rather complex utilizing many components. Furthermore, installation of the steering knuckle onto the axle beam may be difficult in that each bearing assembly must be independently adjusted. Furthermore, lubricant must be periodically added to the bearing cavity. Therefore, what is needed is that improved steering knuckle assembly.

SUMMARY OF THE INVENTION AND ADVANTAGES

The present invention provides a steering knuckle assembly including an axle beam having an end with spaced apart first and second surfaces and a hole extending therebetween. A knuckle includes spaced apart first and second cavities that have first and second bores respectively adjacent to the first and second surfaces. A pin assembly is disposed in the hole. That pin assembly includes first and second ends, one of which may be a knot and the other which may be a head. The ends are disposed within the cavities to secure the knuckle to the axle beam end. First and second bearing assemblies are disposed within first and second bores and about the pin. The bearing assemblies engage the surfaces when the nut is tightened on the pin body to produce a compressive force urging the bearing assemblies into engagement with the surfaces of the axle beam.

In this manner, the draw keys and separate adjustment of the bearing assemblies of the prior art may be eliminated. The present invention also utilizes lubed for life bearings containing seals that retain lubricant within the bearing assembly such that the zerk fittings on the cap may be eliminated. Alternatively, the invention may provide an extended lube arrangement extending the period between service. Accordingly, the above invention provides an improved steering knuckle assembly.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
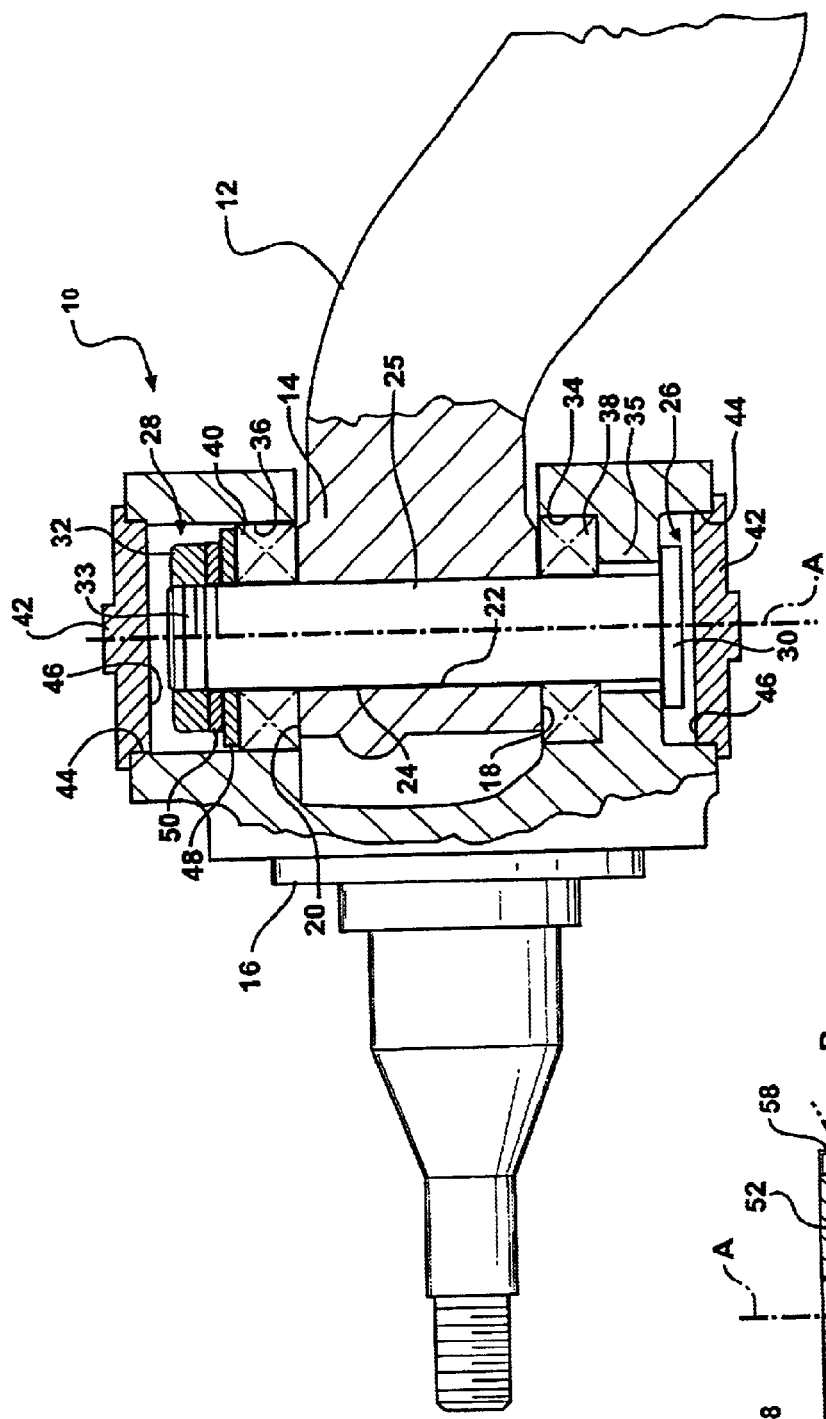
FIG. 1 is a partial cross-sectional view of a front axle steering knuckle assembly.

A steering knuckle assembly 10 is shown in FIG. 1. The assembly 10 includes an axle beam 12 having an end 14. A knuckle 16 is secured to the end 14 to permit rotational movement relative thereto. It is to be understood that the axle beam 12 may be any suitable vehicle structure to which the knuckle 16 may be attached. The end 14 includes first 18 and second 20 spaced apart the surfaces with a cylindrical hole 22 extending therethrough. A pin 24 having a cylinder body 25 is used to secure the knuckle 16 to the axle beam end 14.

The knuckle 16 includes spaced apart first 26 and second 28 cavities on opposing portions of the knuckle 16. The cavities 26 and 28 are adjacent to the surfaces 18 and 20. The pin 24 includes a first end 30 such as a head and a second end 32 such as a nut secured to a threaded portion 33 of the pin 24. The first cavity 26 may include an annular shoulder 35 defining a first bore 34. The second cavity 28 may include a second bore 36. First 38 and second 40 bearing assemblies are respectively disposed within first 34 and second 36 bores and about the pin 24. Preferably, the bearing assemblies 38 and 40 are lubed for life bearings which are available from Timken.

The cavities 26 and 28 include outer portions 44 that receive caps 42 to enclose the pin ends 30 and 32 in the bearing assemblies 34 and 40 within the cavities 26 and 28 to prevent debris from entering the cavities. The caps 42 preferably have unbroken surfaces of 46 defined by the outer portions 44. That is, there is no passage or opening within the caps 44 to permit lubricant to be added to the cavities 26 and 28, such as through a zerk fitting.

In operation, the pin 24 is inserted into the knuckle cavities 26 and 28 through the hole 22 in the end of the axle beam. One of the pin ends 30, such as the head, is arranged in abutment with the annular shoulder 35. A collapsible spacer 48 such as a Belleville spring and washer 50 may be placed over the threaded portion 33 of the pin 24. A nut providing the other end 32 may be tightened about the threaded portion 33 to preload the bearing assemblies 38 and 40 and urge the bearing assemblies into engagement with the first 18 and second 20 surfaces. In this manner, the pin 24 is sufficiently secured to the end 14 through compression thereby obviating the need for a draw key.

Figure 2:
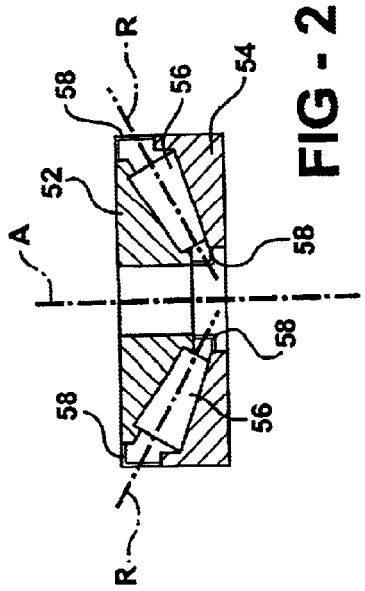
FIG. 2 is a schematic cross-sectional view of a present invention bearing assembly.

One of the bearing assemblies is schematically shown in FIG. 2. The bearing assembly includes an inner 52 and outer 54 race with a plurality of tapered roller bearings 56 arranged therebetween. The rollers 56 on at least one of the bearing assemblies may be arranged such that roller axis R of the rollers 56 is at an obtuse angle relative to the pin axis A to take the clamp load in addition to the radial load. Seals 58 are schematically shown between the races 52 and 54 to retain lubricant therein such that bearing lubricant is not needed for the life of the bearing assembly.

Figure 3:
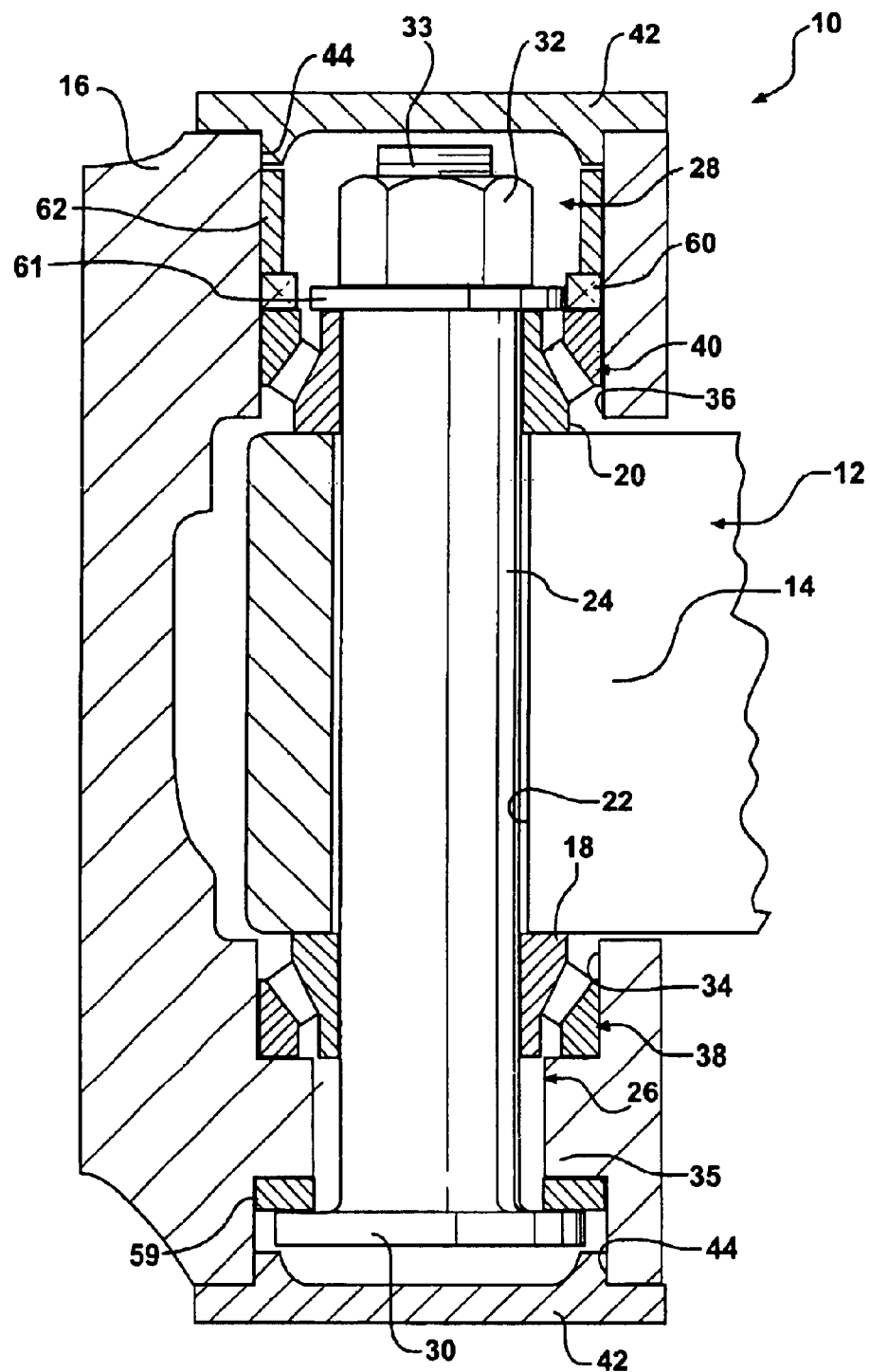
FIG. 3 is a partial cross-sectional view of another front axle knuckle assembly.

Referring to FIG. 3, another steering knuckle arrangement is shown. The bearing assemblies of the present invention greatly reduce the friction within the steering knuckle assembly thereby reducing the overall steering effort to the operator. It is desirable to have friction within the steering system to provide a desired level of steering resistance to the operator. Accordingly, the present invention my incorporate a friction washer 59 between the pin 24 and the steering knuckle 16. More specifically, the friction washer 59 may be arranged between the head of the pin 24 and the annular shoulder 35. The material of the friction washer 59 may be selected to provide a desired friction coefficient yielding a desire resistance within the steering assembly.

A washer 61 may be arranged between the nut, or other end 32, and the bearing assembly 40. A collapsible spacer or spring 60 may be arranged radially outwardly of the washer 61 in abutment with the outer race of the bearing assembly 40. A collar 62 may be disposed within the second cavity 28. The outer portion 44 may be threaded, and a portion of the cap 42 may be disposed within the second cavity 28 and threadably received within the outer portion 44. As the cap 42 is tightened relative to the knuckle 16, the collar 62 engages the spring 60, which preloads the bearing assembly 40.

While is desirable to utilize lubed for life bearing assemblies, it is to be understood that the present invention steering knuckle assembly may provide an extended lube bearing assembly. That is, zerk or other grease fittings may be connected to the caps or other portions of the steering knuckle to permit grease to be added to the cavities containing the bearing assemblies.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A steering knuckle assembly comprising:
    an axle beam having an end with spaced apart first and second surfaces and a hole extending therebetween;
    a knuckle having spaced apart first and second cavities with first and second bores respectively adjacent said first and second surfaces;
    a pin assembly including a pin disposed in said hole with first and second ends respectively disposed within said first and second cavities securing said knuckle to said axle beam end;
    first and second roller bearing assemblies respectively disposed within said first and second bores and about said pin, and respectively engaging said first and second surfaces; and
    wherein one of said cavities includes a shoulder provided by said knuckle, said shoulder extending inwardly from a wall of said one of said cavities transverse to an axis of said pin, one of said pin ends engaging and axially located by said shoulder, one of said bearing assemblies arranged between said shoulder and one of said first and second surfaces.

2. The assembly according to claim 1, wherein caps are disposed within outer portions of said cavities enclosing said cavities at said outer portions.

3. The assembly according to claim 2, wherein said caps include unbroken surfaces disposed within and defined by said cavities.

4. The assembly according to claim 1, wherein said shoulder is annular.

5. The assembly according to claim 1, wherein said one of said pin ends is a head of said pin.

6. The assembly according to claim 1, wherein the other of said pin ends is a nut secured to a threaded portion of said pin, with said nut tightened to produce a compressive force urging said bearing assemblies into engagement with their respective first and second surfaces of said axle beam.

7. The assembly according to claim 6, wherein a collapsible spacer is interposed between the other of said pin ends and the other of said bearing assemblies with said nut compressing said collapsible spacer.

8. The assembly according to claim 7, wherein a washer is arranged between the other of said bearing assemblies and said collapsible spacer.

9. The assembly according to claim 1, wherein said bearing assemblies include a plurality of tapered rollers.

10. The assembly according to claim 9, wherein axes of said tapered rollers of said one of said bearing assemblies are at an obtuse angle relative to an axis of said pin.

11. The assembly according to claim 9, wherein said bearing assemblies include seals retaining lubricant within said bearing assemblies.

12. The assembly according to claim 1, wherein said pin includes an unbroken cylindrical portion received in said hole.

13. The assembly according to claim 1, wherein a friction washer is arranged between a portion of said pin and said knuckle.

14. A method of installing a steering knuckle onto an axle beam comprising the steps of:
    a) aligning a knuckle and an axle beam;
    b) inserting a bolt through the knuckle and axle beam;
    c) tightening a nut onto the bolt;
    d) forcing opposing roller bearings into engagement with the axle beam; and
    e) compressing a collapsible spacer.

15. The method according to claim 14, further including the step of installing caps into the knuckle to enclose cavities in the knuckle.

* * * * *